United States Patent [19]

Jarvinen

[11] Patent Number: 4,567,110
[45] Date of Patent: Jan. 28, 1986

[54] HIGH-TEMPERATURE BRAZED CERAMIC JOINTS

[75] Inventor: Philip O. Jarvinen, Amherst, N.H.

[73] Assignee: Massachusetts Institute of Technology, Cambridge, Mass.

[21] Appl. No.: 284,583

[22] Filed: Jul. 17, 1981

Related U.S. Application Data

[63] Continuation-in-part of Ser. No. 93,576, Nov. 13, 1979, abandoned.

[51] Int. Cl.$^4$ .................... C23C 15/00; B32B 15/04; B23K 1/04
[52] U.S. Cl. .................... 428/433; 204/192 SP; 204/192 C; 228/124; 228/208; 428/627; 428/632; 428/665; 428/680; 428/698; 428/702
[58] Field of Search .................. 204/192 C, 192 SP; 428/469, 472, 627, 632, 665, 698, 680, 702, 433, 446, 450; 228/122, 124, 208, 209

[56] References Cited

U.S. PATENT DOCUMENTS

| | | | |
|---|---|---|---|
| 2,139,431 | 12/1938 | Vatter | 228/208 X |
| 2,667,432 | 1/1954 | Nolte | 428/702 X |
| 3,054,694 | 9/1962 | Aves, Jr. | 428/627 |
| 4,129,848 | 12/1978 | Frank et al. | 338/308 |

OTHER PUBLICATIONS

NASA SP-5052, Joining Ceramics and Graphite to Other Materials, Office of Technology Utilization, National Aeronautics and Space Administration (1968).
Prowcroft, Ceramic to Metal Seals Metallized by Sputtering, *J. Sci. Instrum.* (*J. Physs. E.*) (Britain) vol. 3 (3), Mar. 1970, pp. 211-213.
R. L. Bronnes et al., Ceramic-to-Metal Bonding with Sputtering as a Metallization Technique, *Phillips Technical Review*, vol. 35, No. 7-8, 1975, pp. 209-211.

*Primary Examiner*—G. L. Kaplan
*Assistant Examiner*—William T. Leader
*Attorney, Agent, or Firm*—James E. Maslow; David E. Brook

[57] ABSTRACT

High-temperature joints formed from metallized ceramics are disclosed wherein the metal coatings on the ceramics are vacuum sputtered thereon.

4 Claims, 1 Drawing Figure

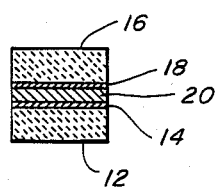

HIGH-TEMPERATURE BRAZED CERAMIC JOINTS

GOVERNMENT SUPPORT

Work relating to this invention was supported by the Department of Energy.

RELATED APPLICATION

This is a continuation-in-part of Ser. No. 93,576, filed Nov. 13, 1979, now abandoned.

FIELD OF THE INVENTION

The invention is in the field of materials and more particularly relates to high-temperature brazed ceramic joints.

BACKGROUND ART

Brazing is a process in which parts are joined with the aid of a filler metal which has a melting point below that of the materials being joined. Brazing has been used to join metallized ceramics to metal or to other ceramics by creation of brazed joints.

Heretofore, metallized coatings have been formed on ceramics by a variety of techniques. One of the well known techniques is the application of molybdenum/manganese paints which are applied to the ceramic article to be metallized and subsequently fired at a high temperature, such as 1200° C., in a wet reducing atmosphere to convert the metal oxides to a metallized layer. In general, this is an example of a sintered metal powder process for forming a metallized ceramic.

Metallized coatings can also be deposited by chemical vapor deposition or by a physical vapor deposition. Among the physical vapor deposition processes employed have been sublimation and evaporation, sputtering and ion plating. See, for example, "Joining Ceramics and Graphite to Other Materials", NASA SP-5052, Office of Technology Utilization, National Aeronautics and Space Administration, pp 20-27 (1968).

Recently, however, applications for brazed joints employing metallized ceramics have developed requiring better high-temperature properties than has heretofore existed with metallized ceramics. High-temperature solar receivers, which convert solar energy to heat and drive a gas turbine to produce electrical power, are an example of such an application. Heat recovery systems in nuclear plants, coal-fired plants or coal gasification plants are other applications which have heretofore been limited in operating temperature, partially because of the lack of brazed joints between metallized ceramics and metals or other ceramics at higher temperatures. In recognition of this, a large amount of research has been conducted directed towards finding or developing metallized ceramics having outstanding properties at high temperatures.

DISCLOSURE OF THE INVENTION

This invention relates to brazed ceramic joints capable of withstanding high temperatures and to novel and unique metallized ceramics which can be employed in such joints. These metallized ceramics are formed by vacuum sputtering a metal, such as nickel or tungsten, onto a ceramic, such as aluminum oxide or silicon carbide. Such metallized ceramics retain good adhesion between the metallized coating and ceramic substrate even at high temperatures.

There are a number of advantages to forming the metallized ceramics described herein by vacuum sputtering.

For example, vacuum sputtering can be used to deposit metals onto ceramics without destroying the ceramic or causing uncontrolled chemical reaction products which can occur in other metal deposition processes because of the higher temperatures required. The vacuum sputtering process is inherently a low temperature process which diminishes formation of reaction compounds between materials being joined. Such reaction compounds usually lower the strength of the bond between the pieces joined.

The vacuum sputtered metallized coatings are impervious and have superb adherence even at very high temperatures.

Vacuum sputtering also particularly lends itself to the deposition of graded metal deposits to reduce thermal stresses in the composite due to different coefficients of thermal expansion between the metal and ceramic.

BRIEF DESCRIPTION OF THE DRAWING

The FIGURE is a side elevational view of one embodiment of a high temperature joint according to this invention.

BEST MODE OF CARRYING OUT THE INVENTION

The invention will now be further described in more specific detail, sometimes with regard to the FIGURE.

The FIGURE illustrates a brazed ceramic joint. This joint is particularly suitable for high-temperature applications, such as applications in which temperatures of 1,000° C. or higher are encountered.

In the joint shown in the FIGURE, first ceramic piece 12 has a metal coating 14 thereon, and similarly, second ceramic piece 16 has a metal coating 18 thereon. These metallized ceramic pieces are bonded together by braze 20.

While the joint in the FIGURE is illustrative of one embodiment of a joint suitable for high-temperature applications according to this invention, a wide variety of other joints are possible. In general, any joint formed by brazing a metallized ceramic to another ceramic, metal or other material is within the scope of the invention.

Any ceramic can be employed as long as it also has high-temperature properties. Examples of such materials include aluminum oxide, mullite and silicon carbide. Silicon carbide has proven to be particularly preferred because of its superior resistance to thermal shock. This resistance is believed to occur as a result of the relatively high thermal conductivity of silicon carbide.

Suitable metals are those metals having a melting point above 1000° C. Refractory metals, including niobium, nickel, rhodium and tungsten, are preferred because of their outstanding high-temperature properties. It is also possible, of course, to have a mixed coating containing more than one of these refractory metals or even a metal coating containing a refractory metal and a non-refractory metal.

The metal coatings are deposited by vacuum sputtering, sometimes also referred to as cathode sputtering. Vacuum sputtering is well known in the art and has been described extensively. See, for example, Narcus, "Metallizing of Plastics", 1960, pp 104-111, the teachings of which are hereby incorporated by reference.

It has been found that a wide range of thicknesses can be employed for the metallized coatings. For example, coatings of 0.5, 1 and 5 μm on a silicon carbide substrate all exhibited good adherence to the substrate at temperatures up to 1400° C. There may be some thicknesses, of course, which will not retain their good adherence at the elevated temperatures, but those skilled in the art will be able to determine suitable operative thicknesses for their particular application.

Surface roughness of the ceramic appears to influence adhesion of the vacuum sputtered refractory metal. Silicon carbide samples having a roughness in the range of 30-60 microinches provided outstanding adhesion, whereas polished pieces of silicon carbide having a roughness of 5-10 microinches resulted in poor adhesion. Thus, roughened surfaces are employed, preferably roughened to more than about 30 microinches.

In many instances, it is desirable to deposit additional metal coatings onto the vacuum sputtered metal coating. For example, coatings of nickel can be applied by vacuum sputtering, electroplating, chemical vapor deposition, or other techniques over a tungsten coating which has been vacuum deposited onto a silicon carbide substrate. A nickel surface has the advantage that aerospace brazes can be employed and such brazes are typically more economical than expensive brazes including gold, silver, etc., which might otherwise be required to bond to certain vacuum sputtered metals.

Additionally, protective coatings can be applied to the metallized ceramics to offer additional protection. For example, coatings having better oxidation resistance than the metallized coating can be applied. Silicon carbide, for example, can be overcoated onto a metallized ceramic. Such protective coatings can be applied by vacuum sputtering, but also can be applied by other techniques, such as chemical vapor deposition, since they need not have the outstanding adhesion required between the vacuum sputtered metal coating and ceramic. Such protective oxidation resistant coatings are applied to the edges of the metallized ceramic to prevent oxidation, but still allow joint formation with the metal surface.

These metallized ceramics are useful in any of the known joint configurations and useful with any of the known high temperature brazes. A good description of both can be found in the NASA SP-5052 report cited above, the teachings of which are hereby incorporated by reference in regard to high temperature brazes and joint configurations.

The invention can be further specifically illustrated by the following examples.

EXAMPLE 1

Silicon carbide coupons (Norton NC-430) were vacuum sputtered with tungsten or tungsten plus other coatings as follows. The ceramic coupons were prepared for metallizing by ultrasonic cleaning in a detergent bath followed by distilled water rinsing and air drying. The ceramic sample was then placed in a vacuum sputtering unit as follows: Material Research Corp. radio-frequency diode sputtering system in titanium purified argon gas at a pressure of 0.01 mm Hg with 5-inch targets. The sputtering apparatus was activated to back sputter the surface of the ceramic coupon with argon ions to further clean the surface. Thereafter, tungsten metal was deposited at a temperature of about 300° C. In some cases, nickel was vacuum sputtered on top of the tungsten, and in one case, nickel and rhodium were sputtered on top of the tungsten coating. The results are as follows:

| Coating | Max. Test Temp. | Remarks |
| --- | --- | --- |
| 0.5 μm W | 1400° C.[1] | Good adherence of coating to 1400° C. |
| 1 μm W | 1400° C.[1] | Good adherence of coating to 1400° C. |
| 5 μm W | 1400° C.[1] | Good adherence of coating to 1400° C. |
| 0.5 μm W and .5 μm Ni | 1300° C.[2] | Good adherence to 1300° C. |
| 1 μm W and 5 μm Ni | 1300° C.[2] | Good adherence to 1300° C. |
| 5 μm W and 5 μm Ni | 1300° C.[2] | Good adherence to 1300° C. |
| 1 μm W and 5 μm Ni | 1250° C.[2] | Good adherence to 1250° C. |
| 5 μm W and 5 μm Ni | 1300° C.[2] | Good adherence to 1300° C. |
| 5 μm and W and .5 μm Ni and 2.5 μm Rh | 1100° C.[2] | Deterioration starts in 800-1000° C. range |

[1]Furnace tests were conducted at 600, 800, 100, 1200 and 1400° C.
[2]Furnace tests were conducted at 600, 800, 1000, 1050, 1100, 1150, 1200, 1250 and 1300° C.

As can be seen, tungsten sputtered onto silicon carbide provided excellent adhesion at various thicknesses and up to 1400° C., which was the maximum temperature tested. Sputtered nickel coatings on tungsten did not detract from the adherence up to 1300° C., which was the maximum temperature employed.

For some reason, a rhodium coating on top of the nickel coating did detract significantly from the adherence of the coatings.

EXAMPLE 2

Aluminum oxide ceramic coupons were coated with nickel, niobium and combinations of niobium and nickel according to the methods employed in Example 1. The results were as follows:

| Coating | Max Test Temp. | Remarks |
| --- | --- | --- |
| .8 μm Ni | 1300° C.[2] | Good adherence to 1300° C. |
| .2 μm Nb and .78 μm Ni | 1100° C.[2] | Deterioration starts at 600° C. |
| .5 μm Nb and .5 μm Ni | 1050° C.[2] | No good even at room temp. |
| .5 μm Nb | 1050° C.[2] | Good adherence to 1050° C. |
| 1 μm Nb | 1100° C.[2] | Good adherence to 1100° C. |
| 5 μm Nb | 1100° C.[2] | Good adherence to 1100° C. |
| .5 μm Nb and 4 μm Ni | 1300° C.[2] | Good adherence to 1300° C. |
| 1 μm Nb and 5 μm Ni | 1300° C.[2] | Good adherence to 1300° C. |
| 5 μm Nb and 5 μm Ni | 1250° C.[2] | Deterioration starts at 800° C. |

EXAMPLE 3

Vacuum sputtered coatings of tungsten or tungsten plus nickel were vacuum sputtered onto mullite coupons according to the procedures of Example 1. The results were:

| Coating | Max Test Temp | Remarks |
| --- | --- | --- |
| .5 μm W | 1300° C.[2] | Good adherence to 1300° C. |
| 1 μm W | 1300° C.[2] | Good adherence to 1300° C. |
| 5 μm W | 1300° C.[2] | Good adherence to 1300° C. |
| .5 μm W and | 1300° C.[2] | Good adherence to 1300° C. |

| Coating | Max Test Temp | Remarks |
| --- | --- | --- |
| 5 μm Ni | | |
| 1 μm W and | 1300° C.[2] | Good adherence to 1300° C. |
| 5 μm Ni | | |
| 5 μm W and | 1050° C.[2] | Coating no good at 1050° C. |
| 5 μm Ni | | or at 800° C. |

INDUSTRIAL APPLICABILITY

This invention is useful in the formation of brazed joints employing metallized ceramics.

EQUIVALENTS

Those skilled in the art will also recognize, or be able to determine using no more than routine experimentation, other equivalents to the specific embodiments described herein. Such equivalents are intended to be covered by the claims appended hereto.

I claim:

1. In the formation of a brazed ceramic joint suitable for use at temperatures over 1,000° C., the improvement of employing a metallized ceramic produced by vacuum sputtering substantially pure unalloyed nickel onto an aluminum oxide ceramic.

2. A brazed ceramic joint formed by the improvement of claim 1.

3. In the formation of a brazed ceramic joint, the improvement of employing a metallized ceramic produced by vacuum sputtering tungsten onto a silicon carbide ceramic having a surface roughness of at least about 30 microinches.

4. A brazed ceramic joint formed by the improvement of claim 3.

* * * * *